United States Patent
Kirchner et al.

(10) Patent No.: US 7,578,950 B2
(45) Date of Patent: Aug. 25, 2009

(54) LIQUID CRYSTALLINE POLYMER COMPOSITION

(75) Inventors: Olaf Norbert Kirchner, Genolier (CH); Marion Glen Waggoner, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 345 days.

(21) Appl. No.: 10/876,075

(22) Filed: Jun. 24, 2004

(65) Prior Publication Data

US 2005/0029494 A1 Feb. 10, 2005

Related U.S. Application Data

(60) Provisional application No. 60/484,013, filed on Jul. 1, 2003, provisional application No. 60/529,920, filed on Dec. 16, 2003, provisional application No. 60/559,836, filed on Apr. 6, 2004.

(51) Int. Cl.
*H01B 1/12* (2006.01)
*C09K 19/02* (2006.01)
*C09K 19/38* (2006.01)

(52) U.S. Cl. ............... 252/511; 252/299.01; 252/299.5; 252/512

(58) Field of Classification Search ............... 524/252, 524/494, 537; 525/439, 450; 252/299.01, 252/299.5, 511, 512
See application file for complete search history.

(56) References Cited

U.S. PATENT DOCUMENTS

| | | | | |
|---|---|---|---|---|
| 4,118,372 A | | 10/1978 | Schaefgen | |
| 4,831,490 A | * | 5/1989 | Voeten et al. | 361/523 |
| 5,051,339 A | * | 9/1991 | Friedrich et al. | 430/311 |
| 5,216,092 A | * | 6/1993 | Huspeni et al. | 525/444 |
| 5,225,488 A | * | 7/1993 | Baird et al. | 525/132 |
| 5,480,930 A | * | 1/1996 | Gentle et al. | 524/414 |
| 5,624,984 A | | 4/1997 | Furuta et al. | |
| 5,646,209 A | * | 7/1997 | Furuta et al. | 524/252 |
| 5,830,940 A | * | 11/1998 | Nakamura et al. | 524/404 |
| 5,927,588 A | * | 7/1999 | Narui | 228/6.2 |
| 6,793,847 B2 | * | 9/2004 | Maeda et al. | 252/299.01 |
| 2002/0017631 A1 | | 2/2002 | Maeda et al. | |
| 2002/0150740 A1 | * | 10/2002 | Chung | 428/201 |

FOREIGN PATENT DOCUMENTS

JP    2001-031848    *    2/2001

OTHER PUBLICATIONS

English translation by computer for JP 2001-031848, http://www4.ipdl.ncipi.go.jp/Tokujitu/PAJdetail.ipdl?N0000=60&N0120=01&N2001=2&N3001=2001-031848.*
Derwent Abstract, JP 2002 020621, Sumitomo Chem Co. Ltd., Jan. 23, 2002.
Derwent Abstract, JP 2002 020622, Sumitomo Chem. Co., Ltd., Jan. 23, 2002.
Japanese Abstract JP 0813433, Sumitomo Chem. Co., Ltd., Aug. 8, 1996.
Japanese Abstract, JP 07003137, Sumitomo Che., Co., Ltd, Mar. 22, 1995.
Japanese Abstract, JP 05331356, Sumitom Chem., Co., Ltd., Mar. 3, 1994.

* cited by examiner

*Primary Examiner*—Shean C Wu

(57) ABSTRACT

A liquid crystal polymer composition comprising specified amounts of unsized glass filler and a liquid crystalline polymer having a melting point of about 280° C. or more has improved high temperature stability compared with similar compositions containing sized glass fillers. The compositions are particularly useful where the composition is exposed for long time periods to high temperatures, such as parts in electrical and electronic apparatus, and cookware.

2 Claims, No Drawings

LIQUID CRYSTALLINE POLYMER COMPOSITION

CROSS-REFERENCE TO RELATED APPLICATION

This application claims the benefit of U.S. Provisional Application No. 60/484,013, filed Jul. 1, 2003, U.S. Provisional Application No. 60/529,920, filed Dec. 16, 2003, and U.S. Provisional Application No. 60/559,836, filed Apr. 6, 2004.

FIELD OF THE INVENTION

Liquid crystalline polymer (LCP) compositions having improved resistance to degradation from heat aging at elevated temperatures comprise an LCP and glass fillers which have no sizing.

TECHNICAL BACKGROUND

Liquid crystalline polymers (LCPs) have become important items of commerce, being useful as molding resins for general purpose uses, and more specifically in the electrical and electronics industries due to their thermal stability, chemical resistance, and other desirable properties. For many applications, the molding resins should exhibit good stability when they are briefly heated, as well as when they are kept at high temperatures over extended time periods.

When aged at high temperatures LCP compositions exhibit one or more deleterious properties. Blistering is a phenomenon when gaseous inclusions ("bubbles"), especially larger inclusions, form within the polymer matrix. The observed result is undesirable blisters that are formed underneath the skin of the part. Thermooxidative degradation is a phenomenon exhibited by virtually all organic polymers, especially at higher temperatures and/or in the presence of oxygen. The rate of degradation depends on factors including temperature, the nature of the medium in contact with the part, the presence of damaging radiation, and the time that the part is exposed to this environment. While they often have excellent heat aging resistance compared to other thermoplastic materials, even LCPs sometimes suffer thermooxidative degradation, given severe enough conditions. Such degradation often leads to a gradual weight loss from the polymeric component, leaving behind inert components such as fillers. Other physical properties such as toughness, tensile strength and elongation at break often decrease in parallel with this weight loss, and these are therefore often measurable indicators for thermooxidative degradation. The rate of thermooxidative degradation is normally progressively higher at higher temperatures, typically following an exponential Arrhenius-type correlation with temperature.

Glass fillers such as fibers are used extensively to modify the physical properties. Such glass fillers are manufactured by a variety of processes, the most commonly used of which provides glass fiber in the form of bundles of many tens or hundreds of fibers each. The advantage of fiber bundles is that are more easily packaged and shipped, and are easier to subsequently feed into compounding equipment used to manufacture glass-reinforced plastics. To form these bundles, the glass fibers receive a very thin coating ("sizing") after they are extruded, and this sizing holds the fibers together in these bundles, and protects the individual fibers from damage by rubbing against each other. Under high-shear conditions usually accompanied by heating, e.g. during compounding into thermoplastics, the bundles break apart and release the individual fibers into the plastic matrix. In addition to these functions, sizing on glass fillers intended for compounding into thermoplastics may also include a coupling agent which improves adhesion of the glass to the thermoplastic, for example with epoxides, silanes and the like. Glass filler such as glass fiber (particularly chopped glass fiber) and milled glass (fiber) used as fillers for thermoplastics almost invariably have sizing on them.

LCP compositions containing glass fibers without sizing are documented, see Japanese Patent Applications 08134334A, 07003137A, JP 05331356A, and U.S. Pat. No. 5,646,209. The compositions described in these references contain LCPs with melting points below 350° C., and/or also contain substantial amounts of other types of polymers which are not stable at higher temperatures. All of these documents are directed towards compositions which have improved physical properties such as tensile strength and elongation.

SUMMARY OF THE INVENTION

This invention concerns a composition, comprising,
(a) a glass filler without sizing; and
(b) a thermotropic liquid crystalline polymer having a melting point of about 350° C. or more.

This invention also concerns a process for forming electrically conductive pathways in an electrical or electronic apparatus, by a soldering bath process, wherein the improvement comprises, said apparatus comprises a composition comprising:
(a) a glass filler without sizing; and
(b) a thermotropic liquid crystalline polymer having a melting point of about 280° C. or more.

Also disclosed herein is an electrical or electronic apparatus having one or more electrically conductive pathways, which comprises:
(a) a glass filler without sizing; and
(b) a thermotropic liquid crystalline polymer having a melting point of about 280° C. or more.

DETAILS OF THE INVENTION

By a "thermotropic liquid crystalline polymer" herein is meant a polymer that is anisotropic when tested using the TOT test or any reasonable variation thereof, as described in U.S. Pat. No. 4,118,372, which is hereby included by reference. Useful LCPs include polyesters, poly(ester-amides), and poly(ester-imides). One preferred form of polymer is "all aromatic", that is all of the groups in the polymer main chain are aromatic (except for the linking groups such as ester groups), but side groups which are not aromatic may be present. Preferably the LCP is at least about 35 weight percent of the composition. Preferably the melting point of the LCP is about 350° C. or higher, more preferably about 365° C. or higher, and especially preferably about 390° C. or higher. Melting points are measured by ASTM Method D3418. Melting points are taken as the maximum of the melting endotherm, and are measured on the second heat at a heating rate of 10° C./min. If more than one melting point is present the melting point of the polymer is taken as the highest of the melting points.

By a "glass filler" herein is meant any relatively small particled or fibrous glass material suitable for mixing into a thermoplastic. Useful glass materials include so-called "E-glass", "S-glass", soda lime glass, and borosilicate glass. This filler may be in any form, such a fiber (fiberglass), milled glass (ground glass fiber), glass flake, hollow or solid spheres.

Preferred forms of glass are glass fiber and milled glass, and glass fiber is especially preferred.

By "without sizing" is meant that the glass (or other material) is not deliberately coated with any organic compounds, including polymers, oligomers, monomeric compounds, or polymerizable compounds. Without sizing includes any glass filler that has been treated at sufficiently high temperature ("calcined") to remove any organic components from its surface. The glass filler may be coated with an inorganic compound such as silica or alumina. Typically, sized glass fillers contain about 0.5-2 percent by weight of sizing.

All percents by weight herein are based on the total composition containing the LCP and glass filler, unless otherwise stated.

Preferably the amount of LCP in the composition is at least about 35 weight percent, more preferably at least about 45 weight percent. Preferably the amount of glass filler (which in some instances may be considered a reinforcing agent) is 0.1 to about 65 weight percent, more preferably about 5 to about 50 weight percent.

Other materials, particularly those often found in or made for use in thermoplastic compositions may also be present in the composition. These materials should preferably be chemically inert and reasonably thermally stable under the operating environment of the molded part in service, and/or during part formation. In particular other polymers which are not substantially thermally stable in the operating environment of the molded part in service or while it is being processed, should preferably be avoided. Stable materials may include one or more of fillers, reinforcing agents, pigments, and nucleating agents. Other polymers may also be present, thus forming polymer blends. If other polymers (other than LCPs) are present it is preferred that they are less than 25 weight percent of the composition. In another preferred type of composition other polymers (than LCPs) are not present except for a small total amount (less than 5 weight percent, more preferably less than 3 weight percent, very preferably less than 1.0 weight percent, and especially preferably none) of polymers such as lubricants and processing aids. In another preferred form the composition contains about 1 to about 55 weight percent of fillers and/or reinforcing agents (other than glass fillers), more preferably about 5 to about 40 weight percent of these materials. Reinforcing agents and/or fillers include fibrous materials such as aramid fibers, wollastonite, titanium dioxide whiskers, and powders (particulates) such as mica, clays, calcium sulfate, calcium phosphate, barium sulfate, and talc. Some of these materials may act to improve the strength and/or modulus of the composition and/or may improve the flammability resistance (see for instance WO02/02717, which is hereby included by reference). Preferred fillers/reinforcing agents include mica and talc. Preferably fillers/reinforcing agents are not sized or otherwise coated with organic materials.

A preferred LCP is made from 4,4'-biphenol/terephthalic acid/isophthalic acid/4-hydroxybenzoic acid or derivatives thereof (100/95/5/100 molar parts) and has a melting point of about 400° C. The molar parts of terephthalic acid/isophthalic acid can also range from about 90/10 to about 97.5/2.5.

Since for many electrical and electronic applications such a composition is preferably flame resistant, that is it is also preferred that the composition have a UL-94 rating of V-1 at a thickness of 0.79 mm, more preferably a UL-94 rating of V-0 at a thickness of 0.79 mm. The UL-94 test (Underwriter's Laboratories) is a flammability test for plastics materials, and the requirements for a V-0 rating are more stringent to those for a V-1 rating. The thinner the test piece, the more difficult it is to achieve a better flammability resistance rating.

Preferably the composition has a Heat Deflection Temperature (HDT) at 1.82 MPa of at least about 240° C., more preferably at least about 275° C., and especially preferably at least about 340° C. The HDT is measured by ASTM Method D648.

The compositions described herein may be made and formed into parts by conventional methods used for mixing and forming thermoplastic compositions. The compositions may be made by melt mixing (the LCP and any other low melting ingredients are melted) the ingredients in a typical mixing apparatus such as a single or twin screw extruder or a melt kneader. Parts may be formed by typical thermoplastic forming methods such as extrusion, extrusion coating, thermoforming, blow molding, or injection molding.

These compositions (in which the LCP any of the mentioned melting points) are particularly useful in electrical and electronic applications, particularly where peak temperatures of up to 260° C. or even 300° C. may be rapidly reached during lead-free soldering or other processing steps, or where continuous temperatures in excess of 260° C. are encountered in service, and especially for temperatures in excess of 280° C. Such uses include lamp sockets, lamp holders, lamp bases, electrical and electronic connectors, circuit boards, lamp holders, terminal blocks, end connectors, heater mounts, ignition coils, relay sockets, high-voltage connectors, spark plug components, emergency switches, controllers and switches for domestic appliances including ovens, cookers and washing machines, electric motor brush holders, coil formers, circuit breakers, circuit breaker housings, contactor housings and print connectors, as well as electrical and electronic connectors, distributors, office equipment parts that are exposed to high temperatures such as in photocopiers and printers, transformer parts such as spacers and supports, switches and microswitches. Further uses include engine turbocharger parts, and engine exhaust parts such as found in gas recycling systems.

Thus the present compositions, wherein the melting point of the LCP is about 280° C. or more, more preferably about 300° C. or more, and especially preferably about 350° C. or more, may readily undergo heating in soldering baths to form (electrical) connections in an apparatus such as a circuit board, or an electrical or electronic connector. As mentioned above, because of the high thermal stability of these compositions, they are particularly useful when using soldering baths which are lead free. These soldering baths tend to operate at higher temperatures.

By "soldering bath process" is meant a process such as reflow soldering or wave soldering that is used to form electrically conductive pathways in/on an apparatus such as a circuit board or electrical connector, which may have attached to it one or more components such as surface mount and/or through hole devices, and which may have a single or multiple layers. Such processes are well known, see for instance: N-C Lee, Reflow Soldering Processes and Troubleshooting, Newnes, Boston, 2001; and J. S. Hwang, Modern Solder Technology for Competitive Electronics Manufacturing, McGraw Hill, New York, 1996, both of which are hereby included by reference.

The use of these soldering bath processes typically results in an electrical or electronic part which has at least one conductive pathway. At least one of these pathways typically comprises solder.

Other uses (where the melting point of the LCP is 350° C. or more, or about 280° C. or more) include cookware and bakeware to take account of the environment experienced by cookware and bakeware during service. This cookware may be coated with a release coating such as a fluoropolymer or silicone based coating. It is often necessary to treat the surfaces of the cookware and/or use primers, and or bake on such release coatings in order to make these release coatings durable. When it is desirable to bake on a primer and/or topcoat high temperatures are often employed. The high temperature stability of the LCP composition of this invention especially permits the use of fluoropolymer coatings with high melting temperatures providing the desirable qualities of excellent durability, stain resistance and improved release. At these high temperatures stability of LCP is very desirable, especially so that the LCP composition does not give off any gases which may become trapped below the release coating or within the LCP thereby forming bubbles (blisters). Since the present LCP compositions have superior thermal stability, they are especially useful for making such coated cookware, or in fact any equipment which it is desired to coat with such nonstick coatings.

The coating compositions used in the present invention can be applied to substrates by conventional means in single or multicoat layers optionally with prior gritblasting of the substrate to increase adhesion. Spray and roller applications forming each layer are the most convenient application methods, depending on the form of the substrate being coated. Other known coating methods including dipping and coil coating may also be used.

Surprisingly, the presence of sizing on the glass seems to make the LCP itself less thermally stable.

In the Examples LCP1 was made from 4,4'-biphenol/terephthalic acid/isophthalic acid/4-hydroxybenzoic acid or derivatives thereof (100/95/5/100 molar parts) and has a melting point of about 400° C.

LCP2 was made from hydroquinone/4,4'-biphenol/terephthalic acid/2,6-naphthalenedicarboxylic acid/4-hydroxybenzoic acid (50/50/60/40/320 molar parts), and had a melting point of about 335° C.

In Examples 1-3 the chopped glass fiber (original length about 5.0 mm before compounding) with a proprietary sizing was TP-78 and the unsized milled glass was REV-4, both from Nippon Sheet Glass Co. Ltd., Takachaya, Tsu, Mie, Japan.

EXAMPLE 1

Using LCP1, the ingredients were fed to Werner and Pfleiderer ZSK-40 40 mm bilobal twin screw extruder, and the temperatures were set so that the melt temperature exiting the extruder was about 410° C. Square cups (60 mm×60 mm×30 mm high, wall thickness 2 mm) were molded on an Engel 1450 injection molding machine, using a clamping force of about 145 tonnes. The melt temperature was about 410° C., and the mold temperature was about 80° C. The composition (percentages by weight of the entire composition) are shown in Table 1, together with the measured weight loss over 12 weeks while aging in an air-circulating oven at 280° C. Note that the weight losses with the sized glass are much higher than the presumed amounts of sizing in the composition, and that in this test the sizing appears to make the LCP itself less thermally stable. Percent by weight loss in Table 1 is based on the weight of the entire composition.

TABLE 1

| | Percent Weight Loss | | | |
|---|---|---|---|---|
| Weeks | 10% unsized glass | 40% unsized glass | 10% sized glass | 40% sized glass |
| 0 | 0.000 | 0.000 | 0.000 | 0.000 |
| 1 | 0.362 | 0.331 | 0.473 | 0.916 |
| 2 | 0.622 | 0.583 | 0.799 | 1.498 |
| 3 | 0.870 | 0.824 | 1.104 | 2.036 |
| 4 | 1.124 | 1.058 | 1.414 | 2.560 |
| 5 | 1.382 | 1.319 | 1.733 | 3.041 |
| 6 | 1.663 | 1.552 | 2.088 | 3.563 |
| 7 | 1.946 | 1.782 | 2.435 | 4.076 |
| 10 | 2.817 | 2.433 | 3.553 | 5.795 |
| 11 | 3.078 | 2.624 | 3.917 | 6.338 |
| 12 | 3.437 | 2.875 | 4.369 | 7.175 |

EXAMPLES 2-3

The composition LCP used, contained 60% LCP and 40% glass fiber. The LCP had a composition of 4,4'-biphenol/terephthalic acid/isophthalic acid/4-hydroxybenzoic acid, 100/95/5/100 molar parts. Two types of plaques were made used. The first type used heat-treated (from 23 to 250° C. over 1 h, then at 250° C. for 2 h, then from 250 to 350° C. over 7 h) LCP composition pellets that were then injection molded into plaques. The second type used a heat treatment (from 23 to 200° C. at 10° C./min, then from 200 to 290° C. at 1° C./min, the 290° C. for 3 h) on the test specimens after injection molding. Heat treatment was use to reduce blistering as discussed in the Technical Background of this application. Plaques were formed by injection molding at a barrel temperature of 430° C., and a melt temperature of 428° C.

Some of the plaques were gritblasted to increase adhesion as noted. Gritblasting was performed with a pressure of 300 kPa (3 bar) and 80 mesh aluminum oxide particles. A typical surface roughness after gritblasting was $R_A$ of 4±0.3 µm. Although not used in these examples, chemical etching may also be used to roughen such surfaces.

Primers and non-stick topcoats used in this work are listed in Table 2. All of these are available from E. I. DuPont de Nemours & Co., Inc., Wilmington, Del. 19899, USA. Resins are abbreviated as:

FEP—Teflon® FEP (a copolymer of tetrafluoroethylene and hexafluoropropylene)
PFA—Teflon® PFA (a copolymer of tetrafluoroethylene and perfluoro(propyl vinyl ether)
PAI—Poly(amide-imide)
PES—Polyethersulfone

TABLE 2

| Commercial Code | Polymer Resin | Coating Type |
|---|---|---|
| 420-424 | PES | Primer |
| 420-704 | FEP/PAI/PES | Primer |
| 856-204 | FEP | Topcoat |
| 856-404 | FEP | Topcoat |
| 857-114 | PFA | Topcoat |
| 955-405 | Silicone | Primer |
| 955-423 | Silicone | Topcoat |

Adhesion was evaluated by (finger) nail adhesion (NA), post water (finger) nail adhesion (PWNA) and post water adhesion (PWA). In the nail adhesion test, a scalpel was used to put a small scratch in the coating. A fingernail was then used to chip or peel away the coating from the edge of the scalpel scratch. The length of the nail track is reported in mm. A nail track length of 0 mm represents excellent adhesion. The PWNA test is performed similarly except the coated LCP was exposed to boiling water for 15 minutes and cooled prior to nail testing. The PWA test is a variation of the ASTM-D-3359 (ISO 2409) adhesion test where the crosshatched coating was subjected to boiling water for 20 min followed by a tape pull using 3M Scotch brand® 898 tape (3M Company, St. Paul, Minn., USA).

EXAMPLE 2

A LCP plaque was optionally gritblasted to roughen the surface and spray coated with a primer composition as shown in Table 3. After baking at 220° C., the plaque was topcoated with a topcoat composition shown in Table 3 and baked at 335° C. for 45 min. The adhesion of the coating was tested using the NA and PWNA test procedures, and results are also shown in Table 3.

TABLE 3

| Example No. | Primer/topcoat | Heat Treatment | Surface preparation | NA | PWNA |
|---|---|---|---|---|---|
| 2a | 420-704/856-404 | pellets heat treated before injection molding | smooth | failure | failure |
| 2b | 420-704/856-404 | pellets heat treated before injection molding | gritblasted | 0 mm | 0 mm |
| 2c | 420-704/856-404 | plaques heat treated post injection molding | smooth | 1 mm | 1 mm |
| 2d | 420-704/856-404 | plaques heat treated post injection molding | gritblasted | 0 mm | 0 mm |
| 2e | 420-704/857-114 | pellets heat treated before injection molding | smooth | 1 mm | 1 mm |
| 2f | 420-704/857-114 | pellets heat treated before injection molding | gritblasted | 0 mm | 0 mm |
| 2g | 420-704/857-114 | plaques heat treated post injection molding | smooth | 1 mm | 1 mm |
| 2h | 420-704/857-114 | plaques heat treated post injection molding | gritblasted | 0 mm | 0 mm |

EXAMPLE 3

A LCP plaque was optionally spray coated with a primer composition from Table 4. After baking at 218° C. for 15 min, the plaque was topcoated with a topcoat composition from Table 4 and baked at 316° C. for 10 min. The adhesion of the coating was tested using the PWA adhesion test as described above.

TABLE 4

| Ex. No. | Primer/topcoat | PWA |
|---|---|---|
| 2a | 955-405/955-423 | 0 mm |
| 2b | none/955-423 | 0 mm |

EXAMPLE 4 AND COMPARATIVE EXAMPLE A

Compositions containing LCP2 were prepared on a twin screw extruder, with the glass used being added by a side feeder. The compositions contained 55.8 (weight) percent LCP2, 4% of a carbon black concentrate, 40% glass, and 0.2% of Licowax® PE190 polyethylene wax, available from Clariant Corp., Charlotte, N.C. 28205, USA. For Example 4 the glass used was OCF 739 milled glass, while for Comparative Example A OCF 408 Fiberglass was used, both available from Owens Corning Fiberglass, Toledo, Ohio, USA. The milled glass was bare (had no sizing), while the fiberglass was sized. Bars (1.6 mm thick, other dimensions according to bars for flexural testing by ASTM method D790) of these compositions were injection molded. These bars were plunged into molten metal (solder) maintained at approximately 270° C., and held in the bath for a specified time. The bars were then withdrawn, allowed to cool, and visually inspected. Bars of Comparative Example A which were in the metal bath for 1, 3, 6 and 9 min were all blistered. Bars of Example 4 immersed for the same time periods were not blistered.

What is claimed is:

1. A process for forming electrically conductive pathways in an electrical or electronic apparatus by a soldering bath process, wherein the improvement comprises, said apparatus comprises a composition comprising:
    (a) a glass filler without sizing; and
    (b) a thermotropic liquid crystalline polymer having a melting point of about 280° C. or more;
    and provided that if one more other polymers is present in said composition, said polymers are less than 25 weight percent of said composition.

2. An electrical or electronic apparatus having one or more electrically conductive pathways made at least in part by a soldering bath process wherein a temperature of 260° C. is reached, which comprises:
    (a) a glass filler without sizing; and
    (b) a thermotropic liquid crystalline polymer having a melting point of about 280° C. or more:
    and provided that if one or more other polymers is present in said composition, said polymers are less than 25 weight percent of said composition.

* * * * *